(12) United States Patent
Woo et al.

(10) Patent No.: US 8,581,934 B2
(45) Date of Patent: Nov. 12, 2013

(54) RENDERING APPARATUS AND METHOD

(75) Inventors: Sang-oak Woo, Anyang-si (KR); Kee-chang Lee, Yongin-si (KR); Hee-sae Lee, Yongin-si (KR); Mahn-jin Han, Yongin-si (KR); Do-kyoon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 597 days.

(21) Appl. No.: 11/898,777

(22) Filed: Sep. 14, 2007

(65) Prior Publication Data

US 2008/0122837 A1    May 29, 2008

(30) Foreign Application Priority Data

Nov. 28, 2006 (KR) .................. 10-2006-0118639

(51) Int. Cl.
- *G09G 5/00* (2006.01)
- *G06F 3/033* (2006.01)
- *G06T 19/00* (2011.01)
- *G06T 11/60* (2006.01)

(52) U.S. Cl.
CPC *G06T 19/00* (2013.01); *G06T 11/60* (2013.01)
USPC .......................... 345/650; 345/661; 345/419

(58) Field of Classification Search
CPC ............................ G06T 19/00; G06T 11/60
USPC .......................... 345/650, 661, 419
See application file for complete search history.

(56) References Cited

U.S. PATENT DOCUMENTS

| | | | | |
|---|---|---|---|---|
| 5,546,530 A | * | 8/1996 | Grimaud et al. | 345/505 |
| 5,684,943 A | * | 11/1997 | Abraham et al. | 345/473 |
| 5,786,820 A | * | 7/1998 | Robertson | 715/853 |
| 5,845,270 A | * | 12/1998 | Schatz et al. | 706/11 |
| 5,966,521 A | * | 10/1999 | Takeuchi et al. | 716/6 |
| 6,012,098 A | * | 1/2000 | Bayeh et al. | 709/246 |
| 6,144,962 A | * | 11/2000 | Weinberg et al. | 1/1 |
| 6,154,215 A | * | 11/2000 | Hopcroft et al. | 345/418 |
| 6,205,575 B1 | * | 3/2001 | Sherman et al. | 717/100 |
| 6,223,145 B1 | * | 4/2001 | Hearst | 703/22 |
| 6,297,824 B1 | * | 10/2001 | Hearst et al. | 715/848 |
| 6,380,957 B1 | * | 4/2002 | Banning | 715/828 |
| 6,487,565 B1 | * | 11/2002 | Schechter et al. | 715/203 |

(Continued)

FOREIGN PATENT DOCUMENTS

| | | |
|---|---|---|
| JP | 2000-67355 | 3/2000 |
| JP | 2001-243496 | 9/2001 |

(Continued)

OTHER PUBLICATIONS

Chinese Office Action for corresponding Chinese Patent Application No. 20010162506.2 dated Dec. 31, 2010.

(Continued)

*Primary Examiner* — Javid A Amini

(74) *Attorney, Agent, or Firm* — Staas & Halsey LLP

(57) ABSTRACT

A rendering apparatus and method are provided. A plurality of nodes of interface data are described using the plurality of nodes connected hierarchically and indicate a plurality of selectable items that are analyzed, and the interface data is rendered based on a result of the analysis. Consequently, a creator of interface data to be rendered can expect a time-to-market reduction when creating interface data described in a standardized format.

8 Claims, 14 Drawing Sheets

(56) References Cited

U.S. PATENT DOCUMENTS

| | | | |
|---|---|---|---|
| 6,538,651 B1* | 3/2003 | Hayman et al. | 345/419 |
| 6,583,787 B1* | 6/2003 | Pfister et al. | 345/441 |
| 6,826,727 B1* | 11/2004 | Mohr et al. | 715/235 |
| 6,852,081 B2* | 2/2005 | Sumanaweera et al. | 600/443 |
| 6,894,688 B2* | 5/2005 | Tsuda et al. | 345/419 |
| 6,982,708 B1* | 1/2006 | Mah et al. | 345/418 |
| 7,085,683 B2* | 8/2006 | Anderson et al. | 702/186 |
| 7,088,374 B2* | 8/2006 | David et al. | 345/619 |
| 7,096,431 B2* | 8/2006 | Tambata et al. | 715/834 |
| 7,104,890 B2* | 9/2006 | Tsuda et al. | 463/30 |
| 7,131,059 B2* | 10/2006 | Obrador | 715/209 |
| 7,139,004 B2* | 11/2006 | Saund et al. | 345/582 |
| 7,149,755 B2* | 12/2006 | Obrador | 1/1 |
| 7,173,623 B2* | 2/2007 | Calkins et al. | 345/473 |
| 7,184,538 B1 | 2/2007 | Doskow et al. | |
| 7,392,483 B2* | 6/2008 | Wong et al. | 715/746 |
| 7,426,734 B2* | 9/2008 | Debique et al. | 719/310 |
| 7,495,664 B2* | 2/2009 | Keller et al. | 345/426 |
| 7,538,764 B2* | 5/2009 | Salomie | 345/420 |
| 7,548,237 B2* | 6/2009 | David et al. | 345/420 |
| 7,576,753 B2* | 8/2009 | Saund et al. | 345/619 |
| 7,598,951 B2* | 10/2009 | Lee et al. | 345/419 |
| 7,609,271 B2* | 10/2009 | Lin et al. | 345/474 |
| 7,729,887 B2* | 6/2010 | Sherrill et al. | 702/188 |
| 7,895,522 B2 | 2/2011 | Wong et al. | |
| 7,940,685 B1* | 5/2011 | Breslau et al. | 370/251 |
| 8,319,793 B2* | 11/2012 | Schaepe et al. | 345/619 |
| 2002/0087329 A1* | 7/2002 | Massaro et al. | 704/275 |
| 2003/0063120 A1 | 4/2003 | Wong et al. | |
| 2003/0070061 A1 | 4/2003 | Wong et al. | |
| 2003/0112467 A1 | 6/2003 | McCollum et al. | |
| 2003/0174165 A1* | 9/2003 | Barney | 345/747 |
| 2004/0021661 A1* | 2/2004 | Tsuda et al. | 345/419 |
| 2004/0163046 A1 | 8/2004 | Chu et al. | |
| 2004/0181151 A1* | 9/2004 | Sumanaweera et al. | 600/437 |
| 2004/0222992 A1* | 11/2004 | Calkins et al. | 345/473 |
| 2005/0180330 A1 | 8/2005 | Shapiro | |
| 2005/0210416 A1* | 9/2005 | MacLaurin et al. | 715/851 |
| 2006/0185014 A1* | 8/2006 | Spatscheck et al. | 726/23 |
| 2006/0214937 A1* | 9/2006 | Saund et al. | 345/582 |
| 2007/0065013 A1* | 3/2007 | Saund et al. | 382/186 |
| 2007/0081471 A1* | 4/2007 | Talley et al. | 370/252 |
| 2007/0087756 A1* | 4/2007 | Hoffberg | 455/450 |
| 2007/0130112 A1 | 6/2007 | Lin | |
| 2007/0130514 A1* | 6/2007 | Matthee et al. | 715/523 |
| 2007/0206564 A1 | 9/2007 | Liu et al. | |
| 2007/0239291 A1* | 10/2007 | Wayland et al. | 700/83 |
| 2007/0240052 A1* | 10/2007 | Sherrill et al. | 715/700 |
| 2008/0120129 A1* | 5/2008 | Seubert et al. | 705/1 |
| 2008/0178025 A1 | 7/2008 | Hand et al. | |
| 2008/0193904 A1* | 8/2008 | Santhanam et al. | 434/272 |
| 2008/0216094 A1* | 9/2008 | Anderson et al. | 719/318 |
| 2009/0119578 A1* | 5/2009 | Relyea et al. | 715/234 |
| 2009/0167763 A1* | 7/2009 | Waechter et al. | 345/426 |
| 2009/0213115 A1* | 8/2009 | Keller et al. | 345/419 |
| 2009/0289939 A1* | 11/2009 | Peterson et al. | 345/421 |
| 2010/0007665 A1* | 1/2010 | Smith et al. | 345/473 |
| 2010/0077352 A1* | 3/2010 | Heer et al. | 715/821 |
| 2010/0138735 A1* | 6/2010 | Uematsu | 715/234 |
| 2010/0223200 A1* | 9/2010 | Balson et al. | 705/36 R |

FOREIGN PATENT DOCUMENTS

| | | |
|---|---|---|
| JP | 2003-132068 | 5/2003 |
| JP | 2003-330715 | 11/2003 |
| KR | 10-2006-0020435 | 3/2006 |
| KR | 10-2006-0033842 | 4/2006 |
| WO | 2006/104940 A2 | 10/2006 |

OTHER PUBLICATIONS

Japanese Office Action issued May 21, 2012 in corresponding Japanese Patent Application 2007-307543.

Japanese Office Action for corresponding Japanese Patent Application No. 2007-307543 dated Dec. 20, 2011.

Korean Office Action dated Sep. 17, 2012 issued in corresponding Korean Patent Application 10-2006-0118639.

Bourges-Sevenier M. et al., "Animation framework for MPEG-4 systems", Multimedia Expo, 2000, ICME 2000, IEEE International Conference, Jul. 30-Aug. 2, 2000, vol. 2, pp. 1115-1118.

Daras P. et al., "An MPEG-4 tool for composing 3D scenes" IEEE Multimedia, IEEE Service Center, vol. 11, No. 2, Apr. 2004, pp. 58-71.

Thomas Volk et al., "A Generic User Interface Framework" Proc. Of the 9th Int. Conf. on Human-Computer Interaction, Aug. 1, 2011, pp. 1-9.

European Search Report dated Apr. 25, 2013 in corresponding European Patent Application 07118654.8.

Japanese Office Action issued Oct. 24, 2012 in corresponding Japanese Patent Application 2007-307543.

U.S. Office Action mailed Aug. 5, 2013 in related U.S. Appl. No. 13/862,654.

* cited by examiner

FIG. 4

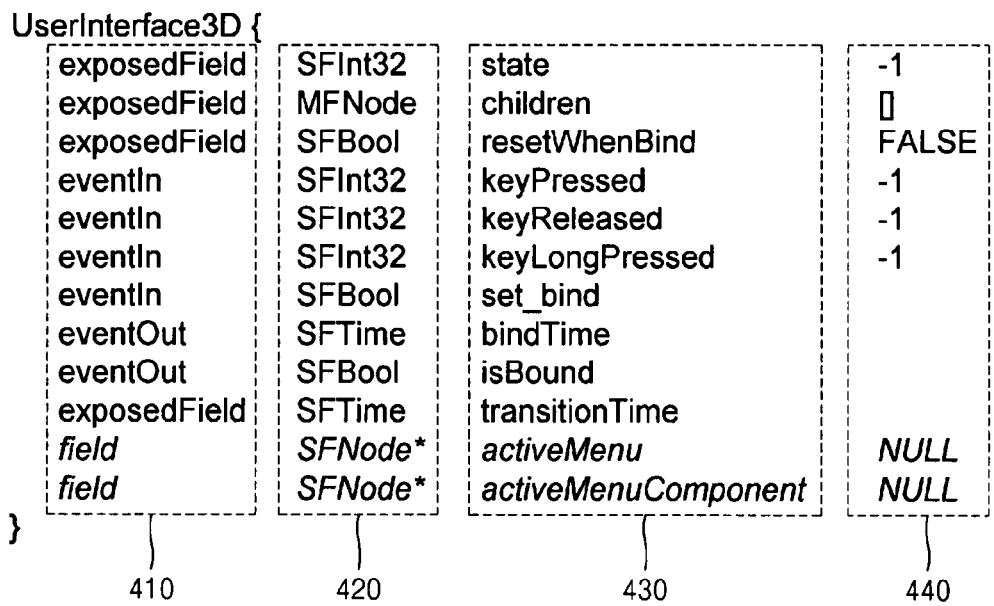

FIG. 5

```
DEF OBJECT_DB Switch { ... }
DEF USER_INPUT KeySenor { ... }
DEF MENU_SYSTEM UserInterface3D {
    state 5
    resetWhenBind TRUE
    children [
        DEF FIRST_MENU Menu { ... }
        DEF SECOND_MENU Menu { ... }
        DEF THIRD_MENU Menu { ... }
        ...
    ]
}
DEF OTHER_TIMER TimeSensor { ... }
ROUTE USER_INPUT.actionKeyPressed TO MENU_SYSTEM.keyPressed
ROUTE USER_INPUT.actionKeyReleased TO MENU_SYSTEM.keyReleased
ROUTE USER_INPUT.actionKeyLongPressed TO MENU_SYSTEM.keyLongPressed
ROUTE MENU_SYSTEM.state_changed TO OBJECT_DB.choice
ROUTE MENU_SYSTEM.transitionTime_changed TO OTHER_TIMER.set_startTime
```

FIG. 7

```
DEF MENU1_OBJECT2_POSINTERP PositionInterpolator { ... }
DEF MENU1_OBJECT3_POSINTERP PositionInterpolator { ... }
DEF MENU1_OBJECT4_POSINTERP PositionInterpolator { ... }
...
DEF FIRST_MENU Menu {
    activeAnimation AnimatorGroup {
        children Animator {
            state 5
            loop FALSE
            animationOrder 0
            resetWhenActive TRUE
            interpolators [
                USE MENU1_OBJECT2_POSINTERP
                USE MENU1_OBJECT3_POSINTERP
                USE MENU1_OBJECT4_POSINTERP
            ]
            Fractions 0.0, 0.25
        }
    }
    children [
        DEF MENU_1_1 MenuComponent { state 1 ... }
        DEF MENU_1_2 MenuComponent { state 2 ... }
        DEF MENU_1_3 MenuComponent { state 3 ... }
        DEF MENU_1_4 MenuComponent { state 4 ... }
        DEF MENU_1_5 MenuComponent { state 5 ... }
    ]
}
```

FIG. 8

MenuComponent {

| field | SFInt32 | state | -1 |
|---|---|---|---|
| field | MFNode | transitions | [] |
| field | SFNode | transAnimations | [] |
| field | SFNode | activeAnimation | NULL |
| field | SFNode | focusAnimation | NULL |
| field | SFInt32 | animationOrder | -1 |
| exposedField | SFTime | activeTime | 0 |
| eventOut | SFTime | inactiveTime | |
| eventOut | SFTime | transitionStartTime | 0 |
| eventOut | SFTime | transitionStopTime | 0 |
| eventIn | SFInt32 | keyPressed | -1 |
| eventIn | SFInt32 | keyReleased | -1 |
| eventIn | SFInt32 | keyLongPressed | -1 |

```
DEF MENU_1_5 MenuComponent {
    state 5
    transitions [
        Transition { key 17 state 7 }        # UP
        Transition { key 18 state 7 }        # DOWN
        Transition { key 19 state 6 }        # RIGHT
        Transition { key 20 state 6 }        # LEFT
        Transition { key 21 state 1 }        # BACK SPACE
    ]
    transAnimations [
        AnimatorGroup { children Animator {
                    loop FALSE
                    interpolators [ USE CAMERA_POSINTERP ]
                    fractions 0.75, 0.8
            } }
        AnimatorGroup { children Animator {
                    loop FALSE
                    interpolators [ USE CAMERA_POSINTERP ]
                    fractions 0.8, 0.85
            } }
        AnimatorGroup { children Animator {
                    loop FALSE
                    interpolators [ USE CAMERA_POSINTERP ]
                    fractions 0.85, 0.9
            } }

AnimatorGroup { children Animator {
                    loop FALSE
                    interpolators [ USE CAMERA_POSINTERP ]
                    fractions 0.9, 0.95
            } }
        AnimatorGroup { children Animator {
                    loop FALSE
                    interpolators [
                            USE CAMERA_POSINTERP
                            USE MENU2_OBJECT1_POSINTERP
                            USE MENU2_OBJECT2_POSINTERP
                            USE MENU2_OBJECT3_POSINTERP
                            USE MENU2_OBJECT4_POSINTERP
                    ]
                    fractions 0.75, 0.5        # backward animation
            } }
    ]
    focusedAnimations [
        AnimatorGroup { chidlren Animator {
                    loop TRUE
                    interpolators [
                            USE MENU2_OBJECT1_MESH1_INTERP
                    ]
                    fractions [
                            0.0, 0.5
                    ]
            } }
    ]
}
```

FIG. 10

```
Transition {
    field       SFInt32     keyPressed      -1
    field       SFInt32     keyReleased     -1
    field       SFInt32     keyLongPressed  -1
    field       SFInt32     state           -1
}
```

FIG. 11

```
AnimatorGroup {
    exposedField   MFNode   children   []
}
```

FIG. 12

```
Animator {
    field          MFNode     interpolators       []
    field          SFVec2f    fractions           0 1
    field          SFFloat    cycleInterval       0
    exposedField   SFBool     enabled             TRUE
    exposedField   SFBool     loop                FALSE
    exposedField   SFTime     startTime           0
    exposedField   SFTime     stopTime            0
    eventOut       SFTime     cycleTime
    eventOut       SFBool     isActive
    eventOut       SFFloat    fraction_changed
}
         1210        1220          1230           1240
```

FIG. 13A

```
fraction_changed = (now – temp)/cycleInterval + fractions.x
if fraction_changed >= fractions.y {
    if loop == TRUE          {
        temp = now - (fraction_changed - fractions.y)
        fraction_changed = fraction_changed - fractions.y + fractions.x
    }
    else
        fraction_changed = fractions.y
}
```

FIG. 13B

```
fraction_changed = -(now – temp)/cycleInterval + fractions.x
if fraction_changed <= fractions.y {
    if loop == TRUE {
        temp = now - (fraction_changed - fractions.y)
        fraction_changed = fraction_changed - fractions.y + fractions.x
    }
    else
        fraction_changed = fractions.y
}
```

RENDERING APPARATUS AND METHOD

CROSS-REFERENCE TO RELATED APPLICATIONS

This application claims the benefit of Korean Patent Application No. 10-2006-0118639, filed on Nov. 28, 2006, in the Korean Intellectual Property Office, the disclosure of which is incorporated herein in their entirety by reference.

BACKGROUND

1. Field

One or more embodiments of the present invention relate to rendering, and more particularly, to rendering of interface data having a plurality of selectable items.

2. Description of the Related Art

A user of a terminal can manipulate the terminal while being provided with a user interface (UI) screen that changes with a result of manipulation with respect to the terminal from the terminal. The UI screen displays one of various menus that can be provided by the terminal. A single menu includes a plurality of selectable items.

Interface data having graphic information of UI screens displaying menus is described in the unique format of each terminal. Thus, in order to create interface data for authored content, a programmer has to reconstruct the authored content so as to be suitable for the unique format of each terminal.

In other words, in spite of fast content authoring, the authored content has to be suitably reconstructed for the unique format of each terminal in order to create interface data, causing a limitation in terms of how fast the interface data can be created. Such a limitation becomes more distinct when the programmer is not familiar with the unique format of each terminal and the authored content is 3-dimensional (3D) content.

SUMMARY

One or more embodiments of the present invention provide a rendering apparatus which renders interface data that is described in such a way that it can be created quickly.

One or more embodiments of the present invention also provide a rendering method which renders interface data that is described in such a way that it can be created quickly.

One or more embodiments of the present invention also provide a computer-readable recording medium having recorded thereon interface data that is described in such a way that it can be created quickly.

Additional aspects and/or advantages will be set forth in part in the description which follows and, in part, will be apparent from the description, or may be learned by practice of the invention.

To achieve at least the above and/or other aspects and advantages, embodiments of the present invention include a rendering apparatus including, an analysis unit to analyze a plurality of nodes of interface data that are described using the plurality of nodes connected hierarchically and indicate a plurality of selectable items, and a rendering unit to render the interface data based on a result of the analysis.

To achieve at least the above and/or other aspects and advantages, embodiments of the present invention include a rendering method including, analyzing a plurality of nodes of interface data that are described using the plurality of nodes connected hierarchically and indicate a plurality of selectable items, and rendering the interface data based on a result of the analysis.

To achieve at least the above and/or other aspects and advantages, embodiments of the present invention include a computer-readable recording medium having recorded thereon data described using a plurality of nodes connected hierarchically, the plurality of nodes including, at least one user interface (UI) node, a plurality of menu nodes that are nearest neighbor sub nodes of the UI node and are selectable, and a plurality of item nodes that are nearest neighbor sub nodes of the menu nodes and describe a plurality of selectable items.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 explains a syntax of a UI node;

FIG. 5 illustrates an example of the syntax illustrated in FIG. 4;

FIG. 7 illustrates an example of the syntax illustrated in FIG. 6;

FIG. 8 explains syntax of an item node;

FIG. 9 illustrates an example of the syntax illustrated in FIG. 8;

FIG. 10 explains syntax of a transition node;

FIG. 11 explains syntax of an animator group node;

FIGS. 12 to 13B explain syntax of an animator node;

DETAILED DESCRIPTION OF EMBODIMENTS

Figure 1A:
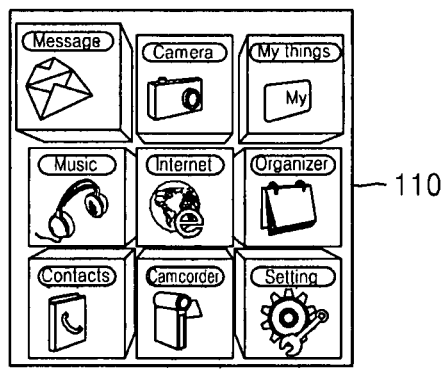
FIGS. 1A to 1C explain a user interface (UI) screen that three-dimensionally displays selectable items.

Reference will now be made in detail to embodiments, examples of which are illustrated in the accompanying drawings, wherein like reference numerals refer to the like elements throughout. Embodiments are described below to explain the present invention by referring to the figures.

Figure 1B:
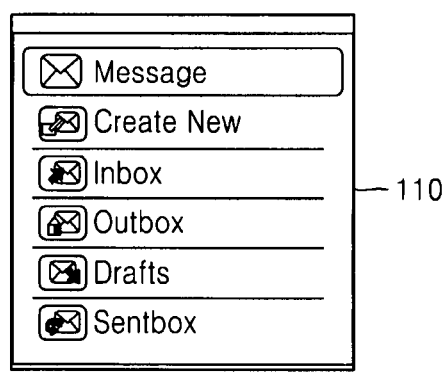
Figure 1C:
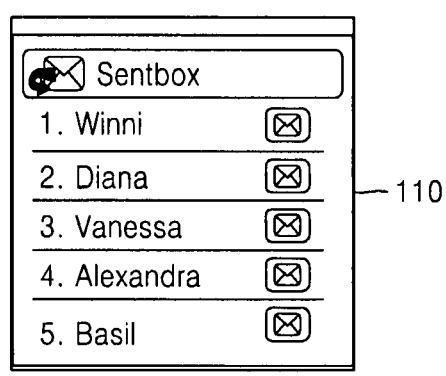

FIGS. 1A to 1C explain a user interface (UI) screen that may be used to three-dimensionally display selectable items. Referring to FIGS. 1A to 1C, a terminal capable of performing 9 functions, e.g., a short message service (SMS) function, a camera function, a personal document management function, a music playback function, an Internet function, a schedule management function, a call origination/reception function, a camcorder function, and an environment setting function, may display menus on a display window 110 included in the terminal.

More specifically, FIG. 1A illustrates an initial screen displayed by the terminal. As illustrated in FIG. 1A, a menu may be composed of 9 items. The 9 items, e.g., "Message", "Camera", "My things", "Music," "Internet", "Organizer", "Contacts", "Camcorder", and "Settings" correspond to a short message service (SMS) function, a camera function, a personal document management function, a music playback function, an Internet function, a schedule management function, a call origination/reception function, a camcorder function, and an environment setting function, respectively.

In this case, a user may manipulate the terminal in order to select one of the 9 items, thereby instructing the terminal to execute the selected item. For example, the user may manipulate a button included in the terminal in order to select "Message" from among the 9 items, thereby instructing the terminal to execute the SMS function.

As illustrated in FIG. 1A, each of the 9 items may be displayed in a 3-dimensional (3D) form like a cube. When an item is displayed three-dimensionally, the terminal may apply certain "animation (e.g., motion information)" to the selected item in order to allow the user to accurately recognize the selected item. For example, the terminal may display the selected item "Message" as being protruded as illustrated in FIG. 1A. The terminal may also apply additional animation to the selected item to allow the user to more accurately recognize the selected item. For example, the terminal may display the selected item "Message" as being protruded and rotated. Here, the terminal may start rotating the selected item simultaneously with the protrusion of the selected item or start rotating the selected item after completion of the protrusion of the selected item. After completion of the protrusion and rotation, the terminal may display sub items of the selected item "Message" as illustrated in FIG. 1B. In other words, the UI screen illustrated in FIG. 1B may be a sub screen of the UI screen illustrated in FIG. 1A.

In FIG. 1B, a menu includes 5 items. The 5 items, i.e., "Create New", "Inbox", "Outbox", "Drafts", and "Sentbox" correspond to a new item creation function, a received message management function, a delivery failed message management function, a message drafting function, and a sent message management function.

In this case, the user may manipulate the terminal in order to select one of the 5 items, thereby instructing the terminal to execute the selected item. For example, the user may manipulate the terminal in order to select "Sentbox", thereby instructing the terminal to execute the sent message management function.

As illustrated in FIG. 1B, each of the 5 items may be displayed three-dimensionally. Thus, like in FIG. 1A, the terminal may display the selected item "Sentbox" as being protruded, start rotating the selected item simultaneously with the protrusion of the selected item, or start rotating the selected item after completion of the protrusion of the selected item. After the completion of the protrusion and rotation, the terminal may display sub items of the selected item "Sentbox" as illustrated in FIG. 1C.

The same description as in FIG. 1B may be applied to FIG. 1C. More specifically, FIG. 1C illustrates a UI screen displayed when "Sentbox" is selected in FIG. 1B. In other words, the UI screen illustrated in FIG. 1C is a sub screen of the UI screen illustrated in FIG. 1B.

In FIG. 1C, a menu may include 5 items. The 5 items, e.g., "Winni", "Diana", "Vanessa", "Alexandra", and "Basil" indicate that a recipient of a sent SMS message is Winni, Diana, Vanessa, Alexandra, and Basil, respectively.

Here, the user may manipulate the terminal in order to select one of the 5 items, thereby instructing the terminal to execute the selected item. For example, the user may manipulate the terminal in order to select "Winni", thereby allowing the user to review an SMS message sent to Winni.

In FIG. 1C, each of the 5 items may also be displayed three-dimensionally. Thus, in FIG. 1C, the terminal may display the selected item "Winni" as being protruded, or start rotating the selected item simultaneously with the protrusion of the selected item, or start rotating the selected item after completion of the protrusion of the selected item. After the completion of the protrusion and rotation, the terminal may display the SMS message sent to Winni.

Hereinafter, a "state" may denote an image displayed or to be displayed by a terminal having a display function. Such a terminal, specifically, a terminal like a portable phone capable of performing various functions such as a call origination/reception function, a music playback function, and a camera function as well as the display function, is an example of a rendering apparatus, according to an embodiment of the present invention. For example, a "state" illustrated in FIG. 1A, e.g., a state in which the terminal displays an initial screen, a "state" illustrated in FIG. 1B, e.g., a state in which the terminal displays sub items of "Message", and a "state" illustrated in FIG. 1C, e.g., a state in which the terminal displays sub items of "Sentbox" may be different from each other.

As such, "states" of UI screens having a hierarchical relationship may be different from each other and "states" of UI screens having a non-hierarchical relationship may also be different from each other. For example, for images displayed in the form of rows as illustrated in FIGS. 1B and 1C, if the terminal can only display a maximum of 6 images out of m images due to a limitation in the size of the display window 110, the user can scroll through the m images by manipulating direction keys →, ←, ↑, ↓ of the terminal, in which m is an integer greater than 6. As such, UI screens obtained by a user's scrolling actions need not have a hierarchical relationship. "States" of such UI screens may be different from one another.

Figure 2:
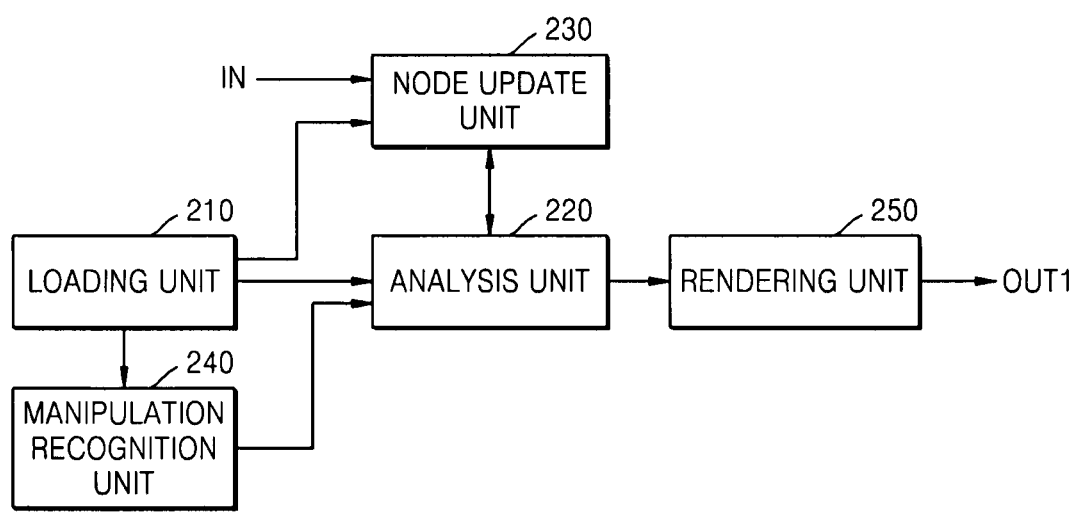
FIG. 2 illustrates a rendering apparatus, according to an embodiment of the present invention.

FIG. 2 illustrates a rendering apparatus, according to an embodiment of the present invention. The rendering apparatus may include, for example, a loading unit 210, an analysis unit 220, a node update unit 230, a manipulation recognition unit 240, and a rendering unit 250.

Interface data that is rendered, i.e., visualized, by the rendering apparatus, according to the present invention may be described in a standardized format. More specifically, interface data according to the present invention may be described using a plurality of nodes connected hierarchically. For convenience of explanation, it is assumed that a node, a field, and an event mentioned herein typically have the same meanings as those of a node, a field, and an event prescribed in representative text-format language expressing 3D graphics, i.e., virtual reality modeling language (VRML). In other words, the node can include the field defining the attributes of the node and the event that is a message transmitted from one node to another node. Each node may have its own fixed field group.

However, nodes describing interface data, according to the present invention are not prescribed in the VRML standard. In other words, the VRML standard does not prescribe a node for describing interface data, e.g., data having graphic information of UI screens displaying menus. Nodes describing interface data according to the present invention may include at least one UI node, a plurality of selectable menu nodes that are nearest neighbor sub nodes of the UI node, and a plurality of item nodes that are nearest neighbor sub nodes of the menu nodes and describe a plurality of selectable items. The nodes will be described later with reference to FIGS. 3 through 13.

In an embodiment of the present invention, it is preferable that the rendering apparatus, include a file storage unit (not shown). The file storage unit (not shown) may store interface data provided to the rendering apparatus, according to the present invention.

When the rendering apparatus, according to an embodiment of the present invention, renders the stored interface data the loading unit 210 may load the stored interface data.

The analysis unit 220 may analyze nodes describing the loaded interface data. More specifically, the analysis unit 220 may analyze which node, among all nodes describing the loaded interface data, is to be rendered and may analyze the contents of the node to be rendered.

The node update unit 230 may incorporate a state transition table (STT) of at least one node that is subordinate to each of all nodes describing the loaded interface data into each of the nodes. The STT is a table that stores "information about a state to be transited to" using a manipulation result of the rendering apparatus, according to the present invention, as an address. Hereinafter, the "state" may mean unique identification information of an item node, e.g., a unique ID of an item node. In an embodiment, it is preferable that the expression "Node A is subordinate to Node B" denotes that Node A is subordinate to Node B as the nearest neighbor sub node of Node B. As will be described later below in more detail, among all nodes describing interface data provided to the rendering apparatus, according to the present invention, a node indicating a state information table is originally an item node. As also will be described later below in more detail, when a button in the rendering apparatus, according to the present invention is manipulated, the analysis unit 220 may determine a state corresponding to the "manipulation result" and determine nodes corresponding to the determined state as nodes that are to be rendered. At this time, the analysis unit 220 may have to consider the "latest result of rendering performed by the rendering unit 250," as well as the "manipulation result," in order to determine the "state" to be transited to. The analysis unit 220 may determine the state corresponding to the "manipulation result" by analyzing the STT of each item node. Here, the analysis unit 220 may have to conduct an analysis all nodes which are from UI node to item node and describe an interface data, thus consuming much time in analyzing STTs.

In order to speed up the analysis of the STTs, the node update unit 230 may create a single STT by collecting the STTs of a plurality of item nodes that are subordinate to each menu node and incorporate the created STT into each menu node. The node update unit 230 may then create a single STT by collecting the STTs of a plurality of menu nodes that are subordinate to each UI node and incorporate the created STT into each menu node. In this way, the analysis unit 220 may determine the state corresponding to the manipulation result by analyzing only UI nodes without analyzing item nodes.

When the node update unit 230 incorporates the STT of at least one node that is subordinate to each node describing the loaded interface data into each node, in an embodiment, it is preferable that the analysis unit 220 analyzes the interface data output from the node update unit 230.

A plurality of nodes describing the interface data may be changed during operation of the analysis unit 220. More specifically, during operation of the rendering apparatus, according to an embodiment of the present invention, the rendering apparatus may be provided with a node from outside through an input terminal IN and thus the number of nodes describing interface data may increase, or the number of nodes describing interface data may decrease. In particular, a new menu node may be added to menu nodes constituting interface data or some of the menu nodes constituting the interface data may be erased. Likewise, a new item node may be added to item nodes constituting interface data or some of the item nodes constituting the interface data may be erased. When a new menu node is added, in an embodiment it is preferable that the menu node includes a certain STT.

Nodes indicating the initial screen displayed by the rendering apparatus are some of the nodes describing the interface data. The initial screen may be a UI screen displayed by the rendering apparatus, which has not yet been manipulated by the user after the rendering apparatus is turned on.

More specifically, the number of UI nodes among the nodes describing the interface data may be more than 1 and one of the UI nodes may need to be selected in order for the rendering apparatus to display the initial screen. In the following description, the selection of one of the UI nodes may be referred to as the binding of the UI node. In other words, hereinafter a UI node may be a bindable node. The basic concept of "bind" is disclosed in detail in the VRML standard.

Whichever of the UI nodes is to be bound may be prescribed or may not be prescribed in the interface data. If the interface data does not prescribe which one of the UI nodes is to be bound, the first UI node that is analyzed by the analysis unit 220 may be bound.

As such, when one of the UI nodes is bound, a menu node and an item node may need to be selected as sub nodes to be rendered from among sub nodes of the bound UI node. In the following description, the selection of a sub node from among sub nodes of the bound UI node may be referred to as the activation of the sub node.

A sub node that is to be activated from among sub nodes of the bound UI node in order for the rendering apparatus to display the initial screen may be prescribed in the interface data. The activated sub node may differ each time the rendering apparatus is manipulated. In other words, each time the rendering apparatus is manipulated, the "state" of the rendering apparatus may be changed.

The manipulation recognition unit 240 may recognize the manipulation result of the rendering apparatus. For example, when the user manipulates a button of the rendering apparatus, the manipulation recognition unit 240 may recognize which button has been manipulated. The manipulation recognition unit 240 may also recognize how the user manipulates the button, such as whether the user presses the button for a short or long time or takes a finger off the button. The manipulation recognition unit 240 may incorporate the recognition result into the bound UI node of the loaded interface data.

In this case, the node update unit 230 may incorporate the recognition result into the activated item node and the analysis unit 220 may determine the "state" corresponding to the recognition result incorporated into the activated item node by searching the STTs. At this time, the analysis unit 220 may search STTs included in item nodes or the STT incorporated into the UI node by the node update unit 230.

Here, the analysis unit 220 may searche in sub nodes of the bound UI node for an item node and a menu node corresponding to the "state". More specifically, the analysis unit 220 may search in the sub nodes of the bound UI node for an item node and a menu node having unique ID information indicating the "state".

To this end, the analysis unit 220 may first analyze other item nodes that are subordinate to a menu node to which the activated item node is subordinate. If there is no item node corresponding to the "state" in the other item nodes that are subordinate to the menu node to which the activated item node is subordinate, the analysis unit 220 may analyze item nodes that are subordinate to a menu node to which the activated item node is not subordinate.

The analysis unit 220 may then analyze the contents of a node corresponding to the determined "state." In other words, the analysis unit 220 may analyze the contents of the found item node and menu node.

The rendering unit 250 may render the interface data based on the analysis result obtained by the analysis unit 220 and output the rendering result through an output terminal OUT 1. A display device such as a liquid crystal display (LCD) may display the rendering result.

The operation of the rendering apparatus when a UI node is bound will be described later below in more detail with reference to FIG. 14, and the operation of the rendering apparatus when the rendering apparatus is manipulated by the user will be described later below in more detail with reference to FIGS. 15 and 16.

Figure 3:
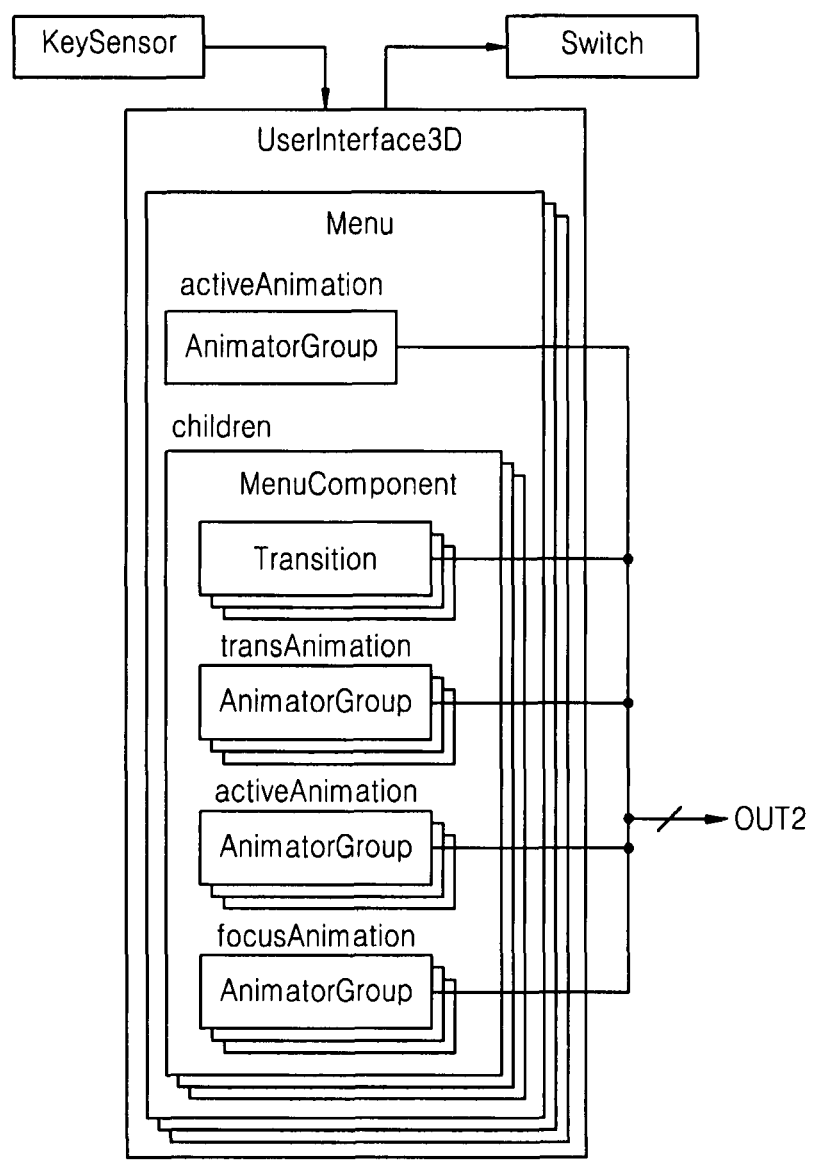
FIG. 3 explains a plurality of nodes that describe interface data rendered by a rendering apparatus, according to an embodiment of the present invention.

FIG. 3 is a reference view for explaining a plurality of nodes that describe interface data rendered by a rendering apparatus, according to an embodiment of the present invention. In the following description, "UserInterface3D", "Menu", "MenuComponent" indicate a UI node, a menu node, and an item node, respectively.

As mentioned above, a UI node is typically a root node, among all nodes describing interface data. The number of UI nodes describing the interface data may be more than 1. In other words, a UI node is generally a bindable node. Menu nodes are nearest neighbor sub nodes of each of the UI nodes and item nodes are nearest neighbor sub nodes of each of the menu nodes. The relationship between the UI nodes, the menu nodes, and the item nodes may be described with reference to FIGS. 1A to 1C. In other words, UI nodes of nodes indicating the UI screen illustrated in FIG. 1A, UI nodes of nodes indicating the UI screen illustrated in FIG. 1B, and UI nodes of nodes indicating the UI screen illustrated in FIG. 1C may be the same as one another. A plurality of item nodes including item nodes describing 9 items, e.g., "Message", "Camera", "My things", "Music", "Internet", "Organizer", "Contacts", "Camcorder", and "Settings", are subordinate to a menu node indicating the UI screen illustrated in FIG. 1A. Likewise, a plurality of item nodes including item nodes describing 5 items, i.e., "Create New", "Inbox", "Outbox", "Drafts", and "Sentbox" are subordinate to a menu node indicating the UI screen illustrated in FIG. 1B. Similarly, a plurality of item nodes including item nodes describing 5 items, e.g., "Winni", "Diana", "Vanessa", "Alexandra", and "Basil" are subordinate to a menu node indicating the UI screen illustrated in FIG. 1C. As such, a UI screen indicated by a menu node and its sub item nodes may have various depths.

A plurality of nodes describing interface data may also include a Transition node, an animator node, an animator group node (AnimatorGroup), a key sensor node (KeySensor), and a switch node (Switch) as well as a UI node, a menu node, and an item node.

At least one of an animator node describing information about activeAnimation and an animator node describing information about inactiveAnimation may be subordinate to a menu node. For convenience of explanation, it is assumed that both of the animator nodes may be subordinate to the menu node.

At least one of a Transition node describing the contents of a STT, an animator node describing information about transAnimation, an animator node describing information about inactiveAnimation, and an animator node describing information about focusAnimation may be subordinate to an item node. For convenience of explanation, it is assumed that the Transition node and all of the animator nodes may be subordinate to the item node.

An animator node may denote a node describing animation that is to be applied to an object to be displayed. The object may be an "object indicated by a menu node, e.g., an image except for items in an UI screen" or an "object indicated by an item node, e.g., the items in the UI screen". The object to be displayed may also be a 3D object. Hereinafter, object data may mean data indicating the object.

An animator group node typically means a node including at least one animator node.

ActiveAnimation, inactiveAnimation, transAnimation, and focusAnimation are examples of animation that may be applied to the object.

ActiveAnimation described in an animator node included in an animator group node that is subordinate to a menu node may mean motion information for making an object distinguishable on the UI screen. At this time, the object that may be an object indicated by the menu node.

Similarly, inactiveAnimation described in an animator node included in an animator group node that is subordinate to a menu node may mean motion information for hiding the object on the UI screen.

TransAnimation described in an animator node included in an animator group node that is subordinate to an item node may mean motion information that is required when the "state" of the rendering apparatus is changed due to manipulation with respect to the rendering apparatus and thus allows the user to recognize the change.

ActiveAnimation described in an animator node included in an animator group node that is subordinate to an item node may mean motion information for making an object distinguishable on the UI screen. At this time, the object may be an object indicated by the item node.

FocusAnimation described in an animator node included in an animator group node that is subordinate to an item node may mean motion information for highlighting movement of an object that moves according to active animation.

Each of ActiveAnimation described in an animator node included in an animator group node that is subordinate to a menu node, inactiveAnimation described in an animator node included in an animator group node that is subordinate to a menu node, transAnimation described in an animator node included in an animator group node that is subordinate to an item node, activeAnimation described in an animator node included in an animator group node that is subordinate to an item node, and focusAnimation described in an animator node included in an animator group node that is subordinate to an item node may be described with reference to FIGS. 1A and 1B as follows.

In FIG. 1A, if the user selects "Message" from among the 9 items by properly manipulating the button provided in the rendering apparatus, the selected item "Message" may be displayed, for example, as vibrating, in contrast to the other still 8 items and the UI screen displaying the 9 items may be gradually reduced in size and even disappear from the sight of the user. At this time, the size reduction of the UI screen displaying the 9 items may be initiated simultaneously with the vibration of the selected item "Message" or after completion of the vibration. In this case, the vibration of the selected item "Message" may correspond to transAnimation described in an animator node that is subordinate to an item node among nodes describing the UI screen illustrated in FIG. 1A, and the size reduction of the UI screen displaying the 9 items corresponds to inactiveAnimation described in an animator node that is subordinate to a menu node among nodes describing the UI screen illustrated in FIG. 1A.

Upon selection of the item "Message" from among the 9 items illustrated in FIG. 1A, the rendering apparatus may render nodes describing the UI screen illustrated in FIG. 1B. Thus, the UI screen illustrated in FIG. 1A may move out of sight of the user, whereas the UI screen illustrated in FIG. 1B may gradually increase in size and move in sight of the user. At the same time, one of the 5 items illustrated in FIG. 1B, e.g., "Sentbox" may be displayed as if protruding more than the other 4 items. At this time, animation indicating item rotation as well as animation indicating item protrusion may be applied to the item "Sentbox". The rotation of the item "Sentbox" may be initiated at the same time as the protrusion of the item "Sent box" or after completion of the protrusion of the item "Sentbox".

In this case, the size increase of the UI screen displaying the 5 items may correspond to activeAnimation described in an animator node that is subordinate to a menu node among nodes describing the UI screen illustrated in FIG. 1B, the protrusion of the item "Sentbox" corresponds to activeAnimation described in an animator node that is subordinate to an item node among the nodes describing the UI screen illustrated in FIG. 1B, and the rotation of the item "Sentbox" may correspond to focusAnimation described in an animator node that is subordinate to an item node among the nodes describing the UI screen illustrated in FIG. 1B.

The key sensor node describes the manipulation result of the rendering apparatus. More specifically, the key sensor node may describe a result of manipulation with respect to a button provided in the rendering apparatus. Here, the button manipulation result may refer to 'which of the buttons provided in the rendering apparatus has been manipulated' and 'how the button has been manipulated'. 'How the button has been manipulated' may mean 'the button is pressed for a short or long time or the pressed button is raised to its original position'.

The switch node may describe information about "states" indicating item nodes that can be rendered and information about "states" indicating item nodes that cannot be rendered.

The analysis unit 220 may analyze the above-described nodes (the UI node, the menu node, the item node, the Transition node, the animator node, the animator group node, the key sensor node, and the switch node) and output the analysis result to the rendering unit 250 through an output terminal OUT 2.

FIG. 4 explains syntax of a UI node, in which 410 may indicate the attributes of a field, 420 may indicate the type of field value, 430 may indicate a field, and 440 may indicate an initial value of a field value.

In association with the attributes of a field 410, "field" may mean that the field cannot be an event delivered to or from a node, "eventIn" may mean an event delivered to a node, "eventOut" may mean an event delivered from a node, "exposedField" may mean that the field can be an event delivered to or from a node. In FIG. 4, the node is a UI node.

In association with the type of a field value 420, "SFInt32" may mean that the field value is an integer, "MFNode" may mean that the field value is a plurality of nodes, "SFBool" may mean that the field value is a Boolean value (TRUE or FALSE), "SFTime" may mean that the field value is a time value, and "SFNode" may mean that the field value is a node.

In association with a field 430, a state field may mean a "state", and a state field value, i.e., state information, may mean unique ID information, e.g., a unique ID, of an item node. The state field value is variable, but typically has to be one of unique ID information of item nodes that are subordinate to a UI node.

The initial value of the state field value defined in a UI node may mean an item node that is first activated among item nodes that are subordinate to a menu node that is first activated when the UI node is bound.

The "state of the rendering apparatus is changed when the rendering apparatus is manipulated. Once the "state" is changed, e.g., an item node to be activated is changed, 'state information indicating the changed item node, i.e., information about a state to be transited to' may be delivered to a UI node through the state field. Here, the state field value of the UI node may be updated with the delivered state information. The UI node may deliver the delivered state information to the switch node. In this case, the analysis unit 220 may determine whether an item node indicated by the delivered state information can be rendered by analyzing the switch node.

A "children" field may have a plurality of menu nodes as field values.

A "resetWhenBind" field may mean that "the state field value of the UI node is changed to the initial value when the same UI node is bound again" if the field value is a predetermined value, e.g., resetWhenBind=TRUE, and that "the state field value of the UI node may maintain the latest value when the same UI node is bound again" if the field value is not the predetermined value, e.g., resetWhenBind=FALSE.

A "keyPressed" field may have a field value when the user presses a button provided in the rendering apparatus for a short time, a "keyreleased" field may have a field value when the pressed button is released from the pressed state, and a "keyLongPressed' may have a field value when the user presses the button for a long time.

When the user manipulates a button provided in the rendering apparatus, the manipulation recognition unit 240 may recognize the manipulation result and incorporate the recognition result into a UI node. At this time, the recognition result may be one of the keyPressed field value, the keyReleased field value, and the keyLongPressed field value and may be delivered to the UI node through one of the keyPressed field, the keyReleased field, and the keyLongPressed field of the UI node. Here, the UI node may deliver the delivered field value to its sub node, strictly an activated item node from among item nodes that are subordinate to the UI node, i.e., an item node indicated by an activeMenuComponent field value.

A set_bind field, a bindTime field, and an is Bound field may be associated with a bindable node. The concepts of the set_bind field, the bindTime field, and the is Bound field are disclosed in greater detail in the VRML standard.

When a UI node is bound, it may deliver its bindTime field value to a menu node to which an item node indicated by the state field value of the UI node is subordinate through an activeTime field of the menu node. The activeTime field of the menu node will be described later.

When a menu node indicated by a state to be transited to by a user's manipulation of the rendering apparatus and a menu node activated during the user's manipulation of the rendering apparatus are different from each other, a UI node may receive an inactiveTime field value, which is delivered from the activated menu node through an inactiveTime field of the activated menu node, through a transitionTime field of the UI node. The UI node may also receive a state field value, which is delivered from the activated menu node through the state field of the activated menu node, through a state field of the UI node. Thus, the state field value of the UI may be updated with the received state field value. Here, a transitionTime field value of the UI node may be delivered to a menu node to which an item menu indicated by the updated state field value is subordinate through an activeTime field of the menu node. Thus, the menu node to which the item node indicated by the updated state field value is subordinate may be newly activated.

An activeMenu field typically has information indicating which one of menu nodes that are subordinate to the bound UI node is currently activated as a field value. An activeMenuComponent field may have information indicating which one of the item nodes that are subordinate to the bound UI node is currently activated as a field value. Since the activeMenu field and the activeMenuComponent field may be considered by the rendering unit 250 during rendering of the interface data, they generally cannot be used by the user who desires to design the syntax of the interface data.

FIG. 5 illustrates an example of the syntax illustrated in FIG. 4. In FIG. 5, DEF for defining and ROUTE routing an event delivery path may be the same as DEF and ROUTE used in the VRML standard.

In FIG. 5, OBJECT_DB, USER_INPUT, MENU_SYSTEM, and OTHER_TIMER may indicate a switch node, a key sensor node, a UI node, and a time sensor node (TimeSensor), respectively. The time sensor node may indicate a time sensor node used for animation in the VRML standard.

"state 5" may mean that a unique ID of an item node to be activated is 5. As illustrated in FIG. 5, a children field value of a UI node may be a plurality of menu nodes FIRST_MENU, SECOND_MENU, THIRD_MENU, and the like.

"ROUTE USER_INPUT.actionKeyPressed TO MENU_SYSTEM.keyPressed" may mean that when the user manipulates a button provided in a terminal by pressing the button short, an event "action.KeyPressed" of a key sensor node defined as USER_INPUT may be delivered to a UI node defined as MENU_SYSTEM through a keyPressed field of the UI node.

Other syntaxes may be described using the same logic as described above.

Figure 6:
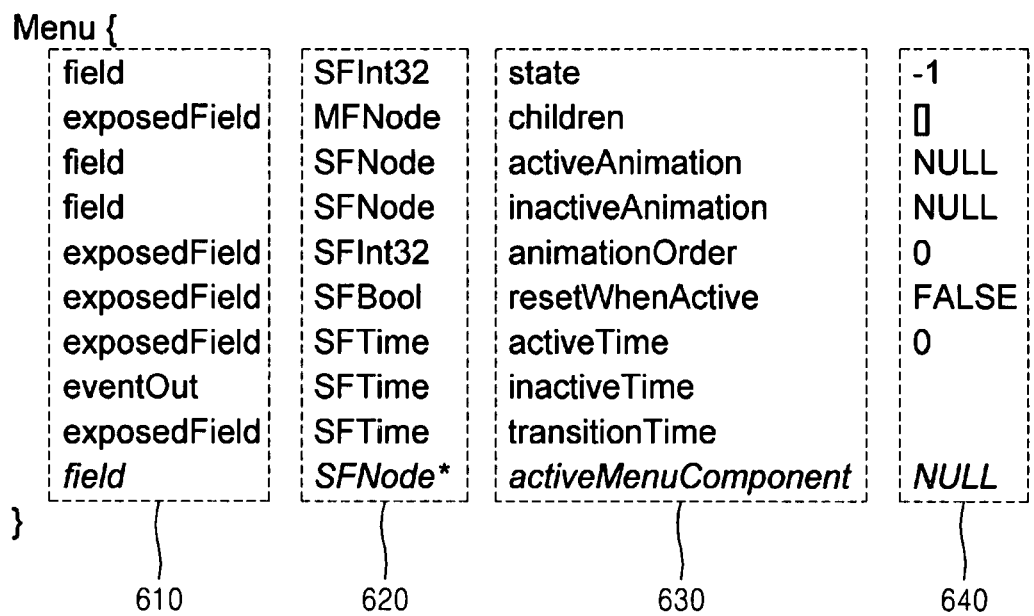
FIG. 6 explains syntax of a menu node.

FIG. 6 explains syntax of a menu node, in which 610 may indicate the attributes of a field, 620 may indicate the type of a field value, 630 may indicate a field, and 640 may indicate an initial value of a field value. A description regarding the attributes of a field and the type of a field value may be substituted by the description made with reference to FIG. 4.

In association with a field 630, a state field may mean a "state" and a state field value, i.e., state information, may mean unique ID information, e.g., a unique ID, of an item node. The state field value may be variable, but typically has to be one of unique ID information of item nodes that are subordinate to a menu node.

An initial value of the state field value defined in a menu node may mean an item node that is first activated among item nodes that are subordinate to a menu node when the menu node is activated.

As mentioned above, the "state" of the rendering apparatus may be changed when the rendering apparatus is manipulated. When the "state" is changed, i.e., an item node to be activated is changed, 'state information indicating the changed item node, e.g., information about a state to be transited to' is delivered to the menu node through the state field of the menu node. In this case, the state field vale of the menu node may be updated with the delivered state information.

A children field may have a plurality of item nodes as field values.

An activeAnimation field may have an animator node describing information about activeAnimation as a field value. An inactiveAnimation field may have an animator node describing information about inactiveAnimation as a field value.

An animationOrder field may indicate a temporal relationship between the start point of rendering of activeAnimation described in an activated menu node and the activation point of an item node that is subordinate to the activated menu node as a field value. For example, when an animationOrder field value is 0, the start point of rendering of activeAnimation described in the activated menu node may be the same as the activation point of the item node that is subordinate to the activated menu node. If the animationOrder field value is 1, the stop point of rendering of animation described in the activated menu node may be the same as the activation point of the item node that is subordinate to the activated menu node.

A resetWhenActive field may mean "when the same menu node is activated again, the state field value of the menu node is changed first" if a field value is a predetermined value, e.g., resetWhenActive=TRUE, and may mean "when the same menu node is bound again, the state field value of the menu node maintains the latest value" if the field value is not the predetermined value, e.g., resetWhenActive=FALSE.

"activeTime" and "inactiveTime" may be described as follows. A menu node may be activated upon receipt of an activeTime field value of the menu node from a UI node and may be deactivated upon receipt of an inactiveTime field value of the menu node from the UI node.

In a similar principle to the above description, an item node may be activated by receiving activeTime from a menu node to which the item node is subordinate. More specifically, the item node may be activated by receiving an activeTime field value of the menu node through the activeTime field of the item node. The other fields included in the item node in addition to the activeTime field will be described in greater detail later below with reference to FIGS. 8 and 9.

A transitionTime field may have a time value required for activating a menu node indicated by a state to be transited to by a user's manipulation of the rendering apparatus as a field value when the menu node is different from a menu node that is activated at the time of the user's manipulation of the rendering apparatus.

An activeMenuComponent field may be the same as that described with reference to FIGS. 4 and 5 and thus will not be described again here.

FIG. 7 illustrates an example of the syntax illustrated in FIG. 6. The syntax illustrated in FIG. 7 may be combined with the syntax illustrated in FIG. 5. In other words, FIG. 7 illustrates the syntax of a menu node defined as FIRST_MENU.

In FIG. 7, MENU1_OBJECT2_POSINTERP, MENU1_OBJECT3_POSINTERP, and MENU1_OBJECT4_POSINTERP indicate position interpolator nodes considered to render activeAnimation described in a menu node. A variety of interpolator nodes such as a position interpolator node, a coordinate interpolator node, and a rotation interpolator node may be subordinate to an animator node that is subordinate to an item node to be described later in greater detail as well as an animator node that is subordinate to a menu node. Details of the interpolator nodes may be disclosed in the VRML standard. However, interpolator nodes prescribed in the VRML standard may describe only animation from fractions=0 to 1 at all times, whereas interpolator nodes used in the interface data according to the present invention may describe animation from fractions=a to b (a and b are real numbers satisfying 0<a<b<1) or from fractions=1 to 0. In other words, the rendering apparatus, according to the present invention may render only a portion of the original animation, e.g., animation from fractions=0 to 1 or render the original animation inversely. Here, "fraction" may mean normalized time. In other words, although animation may mean motion information from time=0 [sec] to 10 [sec], the animation may mean motion information from fractions=0 to 1. In other words, the normalized value of animation-prescribed time is generally 1 at all times, regardless of the denormalized value (cycleInterval) of animation-prescribed time, e.g., 10 seconds.

"state 5" typically means that the unique ID of an item node to be activated is 5. "loop FALSE" means that the rendering apparatus according to the present invention usually does not repetitively render animation described in an animator node. In FIG. 7, the rendering apparatus according to the present invention may render animation, which is described in an animator node from fractions=0.0 to 0.25, once.

As illustrated in FIG. 7, a children field value of a menu node FIRST_MENU may be a plurality of item nodes MENU_1_1, MENU_1_2, MENU_1_3, MENU_1_4, and MENU_1_5.

FIG. 8 explains syntax of an item node, in which 810 may indicate the attributes of a field, 820 may indicate the type of a field value, 830 may indicate a field, and 840 may indicate an initial value of a field value. Description regarding the attributes of a field and the type of a field value may be substituted by description made with reference to FIG. 4.

In association with a field, a state field may indicate a "state" and a state field value, i.e., state information, may mean unique ID information, e.g., a unique ID, of an item node.

A transitions field typically has at least one transition node as a field value. Each transition node may describe "the manipulation result of the rendering apparatus" and "a state to be transited to" corresponding thereto. Thus, a transitions field value may be referred to as an STT.

Each transAnimations field may have an 'animator group node including an animator node describing information about transAnimation' as a field value. Each animator group node constituting a transAnimations field value may correspond to each transition node constituting the transitions field value. Thus, the number of animator group nodes constituting the transAnimations field value may be equal to the number of transition nodes constituting the transitions field value.

An activeAnimation field may have an animator node describing information about activeAnimation as a field value, and a focusAnimation field may have an animator node describing information about focusAnimation as a field value.

When a first activated item node is deactivated and a second deactivated item node is activated, an animationOrder field may indicate a temporal relationship between the start point of rendering of activeAnimation described in the second deactivated item node and the start point of rendering of focusAnimation described in the second deactivated item node as a field value and may also indicate a temporal relationship between the start point of rendering of transAnimation described in the first activated item node and the activation point of the second deactivated item node as a field value.

More specifically, the animationOrder field may be expressed with two bits.

At this time, an upper bit may indicate the temporal relationship between the start point of rendering of activeAnimation described in the second deactivated item node and the start point of rendering of focusAnimation described in the second deactivated item node. For example, if the upper bit is 0, it may mean that the start point of rendering of activeAnimation described in the second deactivated item node and the start point of rendering of focusAnimation described in the second deactivated item node may be the same as each other. On the other hand, if the upper bit is 1, it may mean that the stop point of rendering of activeAnimation described in the second deactivated item node and the start point of rendering of focusAnimation described in the second deactivated item node may not be the same as each other.

A lower bit may indicate a temporal relationship between the start point of rendering of transAnimation described in the first activated item node and the activation point of the second deactivated item node. For example, if the lower bit is 0, it may mean that the start point, i.e., transitionStartTime, of rendering of transAnimation described in the first activated item node and the activation point of the second deactivated item node may be the same as each other. On the other hand, if the lower bit is 1, the completion point, i.e., transitionStopTime, of rendering of transAnimation described in the first activated item node and the activation point of the second deactivated item node may be the same as each other.

"activeTime" and "inactiveTime" may be described as follows. In other words, an item node may be activated upon receipt of an activeTime field value of the item node from a menu node and may be deactivated upon receipt of an inactiveTime field value of the item node from the menu node.

A keyPressed field value may be updated when a keyPressed field value of a UI node is updated. A keyReleased field value may be updated when a keyReleased field value of the UI node is updated. A keyLongPressed field value may be updated when a keyLongPressed field value of the UI node is updated.

FIG. 9 illustrates an example of the syntax illustrated in FIG. 8. The syntax illustrated in FIG. 9 may be combined with the syntaxes illustrated in FIGS. 5 and 7. In other words, FIG. 9 illustrates the syntax of the item node defined as MENU_1_5.

In FIG. 9, "state5" may indicate an unique ID of the item node MENU_1_5 and the number of transition nodes constituting the transitions field, e.g., 5, may be equal to the number of animator group nodes constituting the transAnimations field value.

"key17 state 7" may mean that the "state" of the rendering apparatus transits to a state corresponding to 7 when the user presses a button corresponding to 17 for a short time. "key18 state 7" may mean that the "state" of the rendering apparatus transits to a state corresponding to 18 when the user presses a button corresponding to 18 for a short time. "key19 state 6" may mean that the "state" of the rendering apparatus transits to a state corresponding to 6 when the user presses a button corresponding to 19 for a short time. "key20 state 6" may mean that the "state" of the rendering apparatus transits to a state corresponding to 6 when the user presses a button corresponding to 20 for a short time. "key21 state 1" may mean that the "state" of the rendering apparatus transits to a state corresponding to 1 when the user presses a button corresponding to 21 for a short time.

Each of 4 animator group nodes from among 5 animator group nodes constituting the transAnimations field value may indicate animation that is to be rendered in a forward direction from fractions=0.75 to 0.8, from fractions=0.8 to 0.85, from fractions=0.85 to 0.9, or from fractions=0.9 to 0.95, which is described in a position interpolator node defined as CAMERA_POSINTERP, whereas the remaining 1 animator group node may indicate animation that is to be rendered in a backward direction from fractions=0.75 to 0.5, which are described in position interpolator nodes defined as CAMERA_POSINTERP, MENU2_OBJECT1_POSINTERP, MENU2_OBJECT2_POSINTERP, MENU2_OBJECT3_POSINTERP, and MENU2_OBJECT4_POSINTERP.

On the other hand, an animator group node that is a focusAnimation field value may indicate animation to be rendered in a forward direction from fractions=0.0 to 0.5, which is described in an interpolator node defined as MENU2_OBJECT1_MESH1_INTERP.

In FIG. 9, each of 5 animator group nodes constituting a transAnimations field value may describe "loop FALSE", but an animator group node constituting a focusAnimation field value describes "loop TRUE". Thus, transAnimation generally cannot be rendered repetitively, but focusAnimation generally can be rendered repetitively.

FIG. 10 is a reference view for explaining syntax of a transition node. As mentioned above, at least one transition node may constitute a transitions field value. At this time, each transition node may describe "the manipulation result of the rendering apparatus" and "a state to be transited to" corresponding thereto. In FIG. 10, one of a keyPressed field value, a keyReleased field value, and a keyLongPressed field value may mean "the manipulation result of the rendering apparatus" and a state field value may mean "the state to be transited to" corresponding to the manipulation result of the rendering apparatus.

FIG. 11 is a reference view for explaining syntax of an animator group node.

As illustrated in FIG. 11, the animator group node may have a children field having at least one animator node as a field value.

FIGS. 12 to 13B are reference views for explaining syntax of an animator node.

In FIG. 12, 1210 may indicate the attributes of a field, 1220 may indicate the type of a field value, 1230 may indicate a field, and 1240 may indicate an initial value of a field value. Description regarding the attributes of a field and the type of a field value may be substituted by description made with reference to FIG. 4. However, "SFVec2f" and "SFFloat" (not shown in FIG. 4) are typically the same as those defined in the VRML standard.

In addition, a fractions field, a cycleInterval field, an enabled field, a loop field, a startTime field, a stopTime field, a cycleTime field, and an isActive field may also be fields of a time sensor node defined in the VRML standard.

However, an interpolators field and a fraction_changed field will be described separately.

As described with reference to FIGS. 7 and 9, an interpolator node used in the interface data, according to the present invention may describe animation from fractions=fractions.x to fractions.y (each of fractions.x and fractions.y is between 0 and 1), instead of animation from fractions=0 to 1, in contrast to an interpolator node prescribed in the VRML standard. In particular, for fractions.x≤fractions.y, animation described by the interpolator node may be animation to be rendered in a forward direction and for fractions.x>fractions.y, animation described by the interpolator node is animation to be rendered in a backward direction.

fractions.x may indicate the start point of rendering of animation and fractions.y may indicate the stop point of rendering of animation. For this reason, a plurality of fractions between fractions.x and fractions.y may have to be calculated for rendering animation. The 'calculated fractions (fraction_changed)' may be a fraction_changed field value of the animator node.

The fraction_changed field value may also be calculated as illustrated in FIG. 13A or 13B. More specifically, FIG. 13A illustrates the principle of calculation of the fraction_changed field value when animation described in an interpolator node is animation that is to be rendered in a forward direction, i.e., fractions.x≤fractions.y. FIG. 13B illustrates the principle of calculation of the fraction_changed field value when animation described in an interpolator node is animation that is to be rendered in a backward direction, i.e., fractions.x>fractions.y.

In FIGS. 13A and 13B, "now" may indicate time that the rendering apparatus, according to the present invention recognizes as "current time". A user typically cannot set a value of "now" and the rendering apparatus, according to the present invention may obtain the value of "now" in a preset manner. For example, whenever the user manipulates a button included in the rendering apparatus, according to the present invention, the rendering apparatus may recognize a time at which the button is manipulated as "now". Here, the preset manner is that 'the value of "now" may be updated each time the user manipulates the button'. However, in an embodiment it is preferable that "now" is not normalized time like "fraction", but is denormalized time. "temp" may indicate the start time of rendering of animation, but is denormalized time. For example, fractions.x=0.75 [dimensionless], fractions.y=0.8 [dimensionless], temp=2 [sec], and the stop point of rendering of animation=5 [sec].

Figure 14:
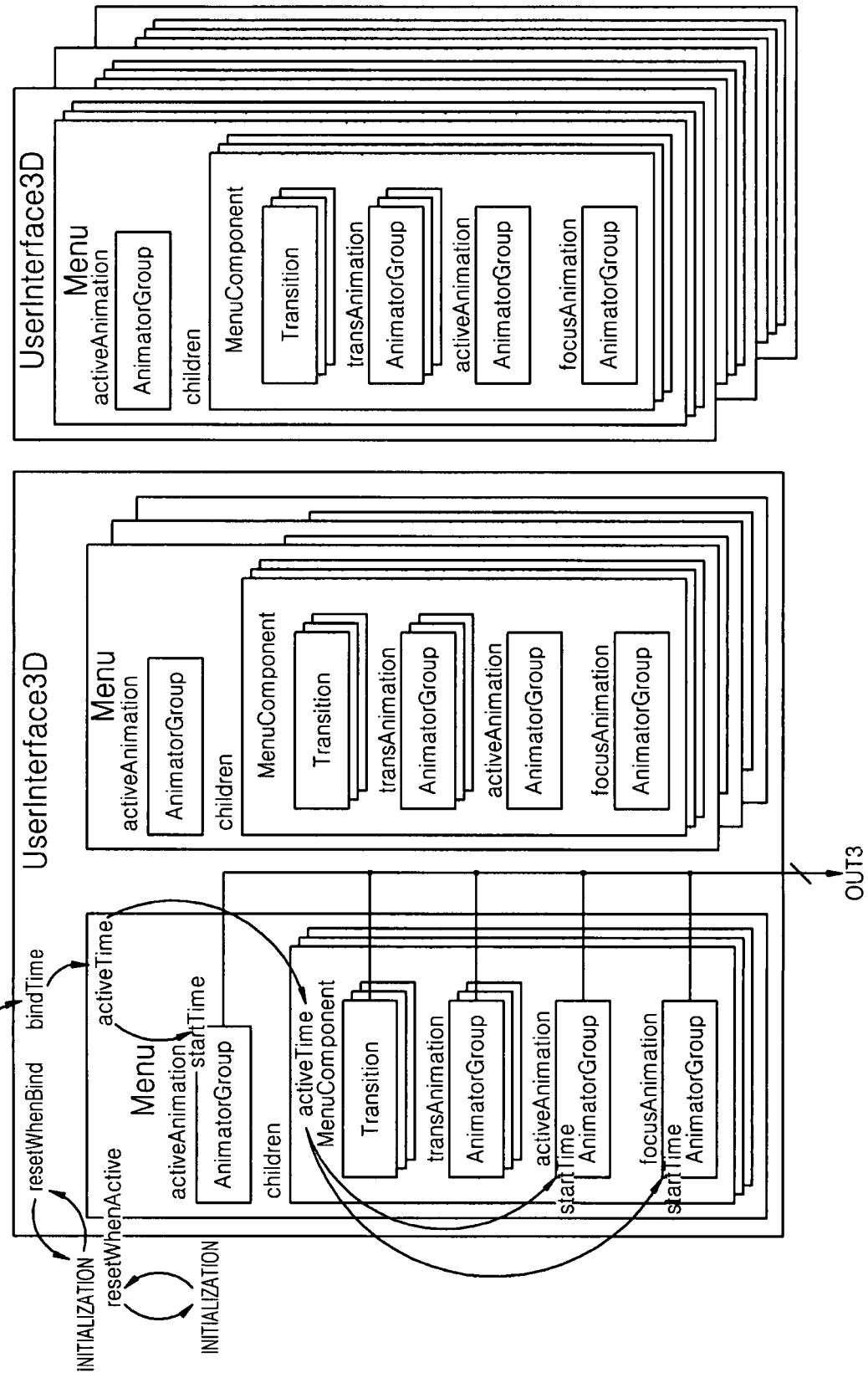
FIG. 14 explain a rendering process, according to an embodiment of the present invention when a UI node is bound.

FIG. 14 explains a rendering process, according to the present invention when a UI node is bound.

Once the loading unit 210 loads the interface data, one of at least one UI node that is present among a plurality of nodes constituting the interface data may be bound. More specifically, the rendering apparatus, according to the present invention may recognize "now" and the recognized "now" may be delivered to one of the at least one UI node through a bindTime field of the UI node, thereby binding the UI node. At this time, the rendering apparatus, according to an embodiment of the present invention may recognize time at which any one of the at least one UI node is not bound as "now".

If the bound UI node has never been previously bound, 'a menu node designated as default' among menu nodes that are subordinate to the bound UI may now be activated. Here, information indicating the menu node designated as default may be an activeMenu field value of the UI node.

On the other hand, if the bound UI node has been previously bound, a menu node to be now activated among the menu nodes that are subordinate to the bound UI may be determined according to a resetWhenBind field value.

In other words, if the resetWhenBind field value is a Boolean value FALSE, e.g., 0, the latest activated menu node among the menu nodes that are subordinate to the bound UI may now be activated. Here, information indicating the latest activated menu node may already be included in the UI node as the activeMenu field value.

On the other hand, if the resetWhenBind field value is a Boolean value TRUE, e.g., 1, 'the menu node designated as default' among the menu nodes that are subordinate to the bound UI may now be activated. In this case, information indicating the menu node designated as default may be the activeMenu field value of the UI node.

Thereafter, the UI node may deliver its state field value and bindTime field value to the menu node to be now activated through its activeMenu field. Thus, a state field value and an activeTime field value of the menu node to be now activated may be updated with the delivered state field value and bindTime field value. In this way, the menu node to be now activated is activated.

At this time, if the activated menu node has never been previously activated, 'an item node designated as default' from among item nodes that are subordinate to the activated menu node may now be activated. Here, information indicating the item node designated as default may be an activeMenuComponent field value of each of a menu node and a UI node to which the menu node is subordinate.

On the other hand, if the activated menu node has been previously activated, an item node to be now activated from among the item nodes that are subordinate to the activated menu node may be determined according to a resetWhenActive field value.

In other words, if the resetWhenActive field value is a Boolean value FALSE, e.g., 0, the latest activated item node from among the item nodes that are subordinate to the activated menu node may now be activated. Here, information indicating the latest activated item node is already included in a menu node and a UI node to which the menu node is subordinate may have an activeMenuComponent field value.

On the other hand, if the resetWhenActive field value is a Boolean value TRUE, e.g., 1, 'an item node designated as default' from among the item nodes that are subordinate to the activated menu node may now be activated. Here, information indicating the item node designated as default may be the activeMenuComponent field value of each of a menu node and a UI node to which the menu node is subordinate.

If the activated menu node indicates activeAnimation, i.e., an animator node describing information about activeAnimation is subordinate to the activated menu node, the menu node may deliver its activeTime field value to the animator node through its activeTime field. Thus, the startTime field value of the animator node may be updated with the delivered activeTime field value. In this way, the rendering of activeAnimation described in the animator node may be started.

If an animationOrder field value of the menu node indicates that "the start point of rendering of activeAnimation described in the activated menu node is the same as the start time of rendering of animation described in the activated item node", the menu node may deliver its state field value and activeTime field value to an item node indicated by its activeMenuComponent field value, i.e., the item node to be now activated. Thus, the state field value and the active time field value of the item node to be now activated may be respectively updated with the delivered state field value and activeTime field value. In this way, the item node to be now activated may be activated.

On the other hand, if the animationOrder field value of the menu node indicates that "the stop point of rendering of activeAnimation described in the activated menu node is the same as the start point of rendering of animation described in the activated item node", the menu node may obtain 'the stop point of rendering of activeAnimation indicated by the menu node, i.e., a stopTime field value of an animator node that is subordinate to the menu node and indicates activeAnimation' from the animator node that is subordinate to the menu node. Thereafter, the menu node may deliver its state field value and the obtained stopTime field value to an item node indicated by its activeMenuComponent field value, i.e., the item node to be now activated. Thus, the state field value and the activeTime field value of the item node to be now activated may be respectively updated with the delivered state field value and stopTime field value. In this way, the item node to be now activated may be activated.

If the activated item node indicates activeAnimation and focusAnimation, i.e., animator group nodes describing information about activeAnimation and information about focusAnimation are subordinate to the activated item node, the rendering of activeAnimation and focusAnimation may be performed based on the animationOrder field value of the activated item node.

More specifically, if the animationOrder field value of the item node indicates that "the start point of rendering of activeAnimation described in the activated item node is the same as the start point of rendering of focusAnimation described in the activated item node", the item node may deliver its activeTime field value to both an animator group node that is subordinate to the item node and indicate activeAnimation and an animator group node that is subordinate to the item node and indicate focusAnimation. Thus, a startTime field value of each animator node included in the animator group node indicating activeAnimation may be the same as that of each animator node included in the animator group node indicating focusAnimation. As a result, the start point of rendering of activeAnimation described in the activated item node may be the same as the start point of rendering of focusAnimation described in the activated item node.

On the other hand, if the animationOrder field value of the item node indicates that "the stop point of rendering of activeAnimation described in the activated item node is the same as the start point of rendering of focusAnimation described in the activated item node", the item node may obtain 'the stop point of rendering of activeAnimation applied to the item node, i.e., the stopTime field value of an animator node included in an animator group node that is subordinate to the item node and indicate activeAnimation' from the animator group node that is subordinate to the item node and indicate activeAnimation. Thereafter, the item node may deliver the obtained stopTime field value to an animator group node that is subordinate to the item node and indicate focusAnimation. Thus, the stopTime field value of each animator node included in the animator group node indicating activeAnimation and the startTime field value of each animator node included in the animator group node indicating focusAnimation may be the same as each other. As a result, the stop point of rendering of activeAnimation described in the activated item node and the start point of rendering of focusAnimation described in the activated item node may be the same as each other.

The analysis unit 220 may analyze the above nodes (e.g., a UI node, a menu node, an item node, a transition node, an animator node, and an animator group node) and output the analysis result to the rendering unit 250 through an output terminal OUT 3.

Figure 15:
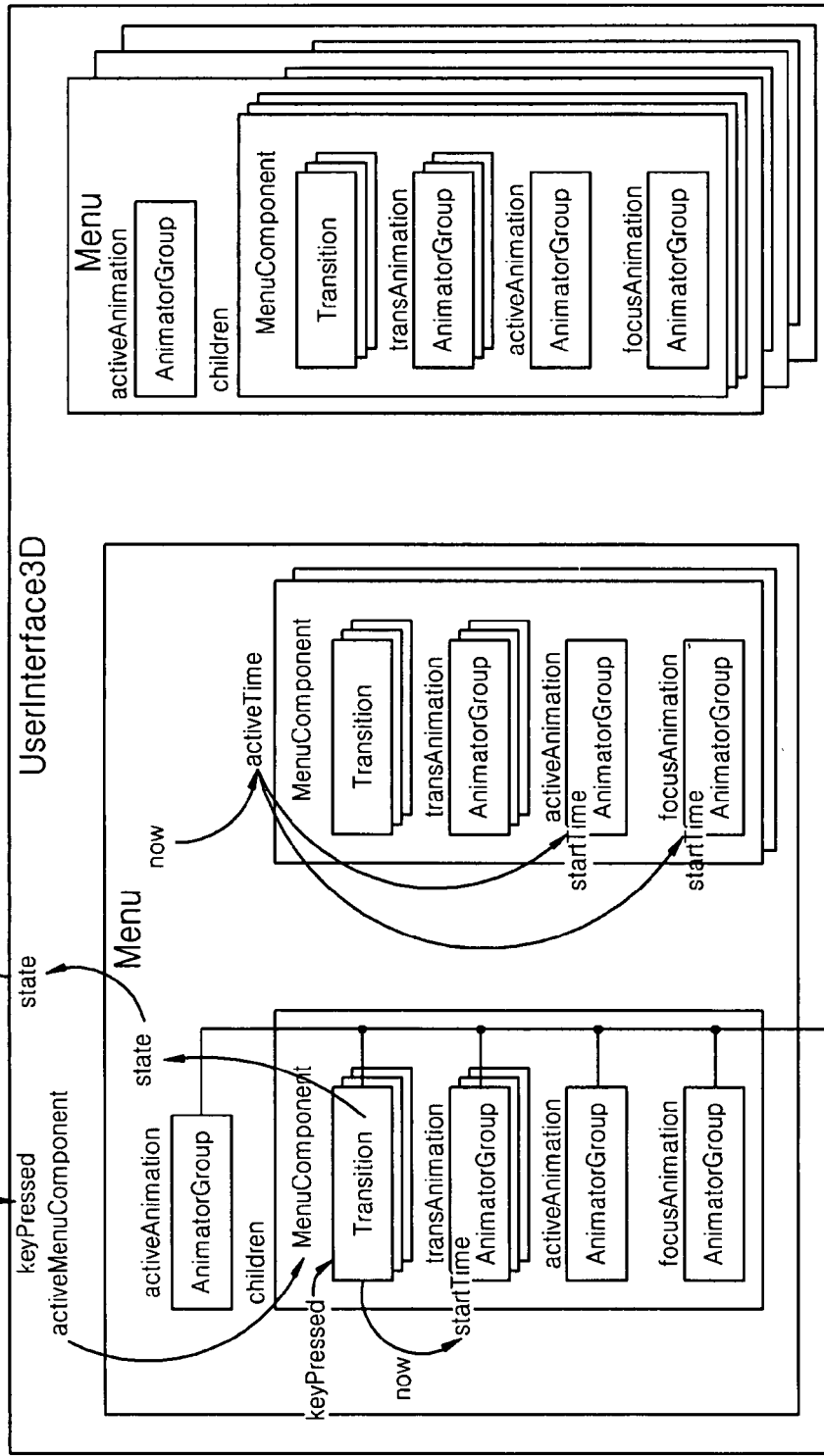
FIG. 15 explain a rendering process, according to an embodiment of the present invention when a rendering apparatus is manipulated.

FIG. 15 explains a rendering process, according to an embodiment of the present invention when, e.g., a rendering apparatus is manipulated. According to an embodiment of the present invention, a menu node indicated by a state to be transit to by user's manipulation of the rendering apparatus may be the same as a menu node activated at the time of user's manipulation of the rendering apparatus. In other words, according to an embodiment of the present invention, state transition occurring in the rendering apparatus may mean that only an activated item node changes, while an activated menu node is maintained. Thus, a rendering process when a user scrolls UI screens may be described as a rendering process according to an embodiment of the present invention as follows.

If the user presses any one of the buttons provided in the rendering apparatus for a short time, the manipulation result may be a keyPressed field value of a key sensor node. The keyPressed field value of the key sensor node may be delivered to a UI node and thus a keyPressed field value of the UI node may be updated with the delivered keyPressed field value.

A "state to be transited to" corresponding to the keyPressed field value of the UI node may be determined according to a description in a transitions field value of the activated item node, and information about the determined state is delivered to a menu node as a state field value of a transition node. Thus, a state field value of the menu node may be updated with the delivered state field value. In addition, the state field value of the menu node may be delivered to the UI node as a state field value of the UI node. Thus, the state field value of the UI node may be updated with the delivered state field value. The state field value of the UI node may be delivered to a switch node as a state field value of the switch node. Thus, the state field value of the switch node is updated with the delivered state field value.

If there is an item node indicated by a state to be transited to from among item nodes that are subordinate to a menu node as in an embodiment of the present invention, "now" may be an activeTime field value of the item node indicated by the state to be transit to. "now" may also be a startTime field value of an animator node included in an animator group node describing transAnimation indicated in an item node that is being activated at the time of user's manipulation of a button included in the rendering apparatus. In FIG. 15, whenever the user manipulates a button included in the rendering apparatus, the rendering apparatus according to an embodiment of the present invention may recognize the point of time at which the user manipulates the button as "now".

"Now" serves as the activeTime field value of the item node indicated by the state to be transited to, thereby activating the item node indicated by the state to be transited to. In this case, a temporal relationship between the start point of rendering of activeAnimation applied to the item node and the start point of rendering of focusAnimation applied to the item node is prescribed in the animationOrder field value of the item node.

The analysis unit 220 may analyze the above nodes (e.g., a UI node, a menu node, an item node, a transition node, an animator node, and an animator group node) and output the analysis result to the rendering unit 250 through an output terminal OUT 4.

Figure 16:
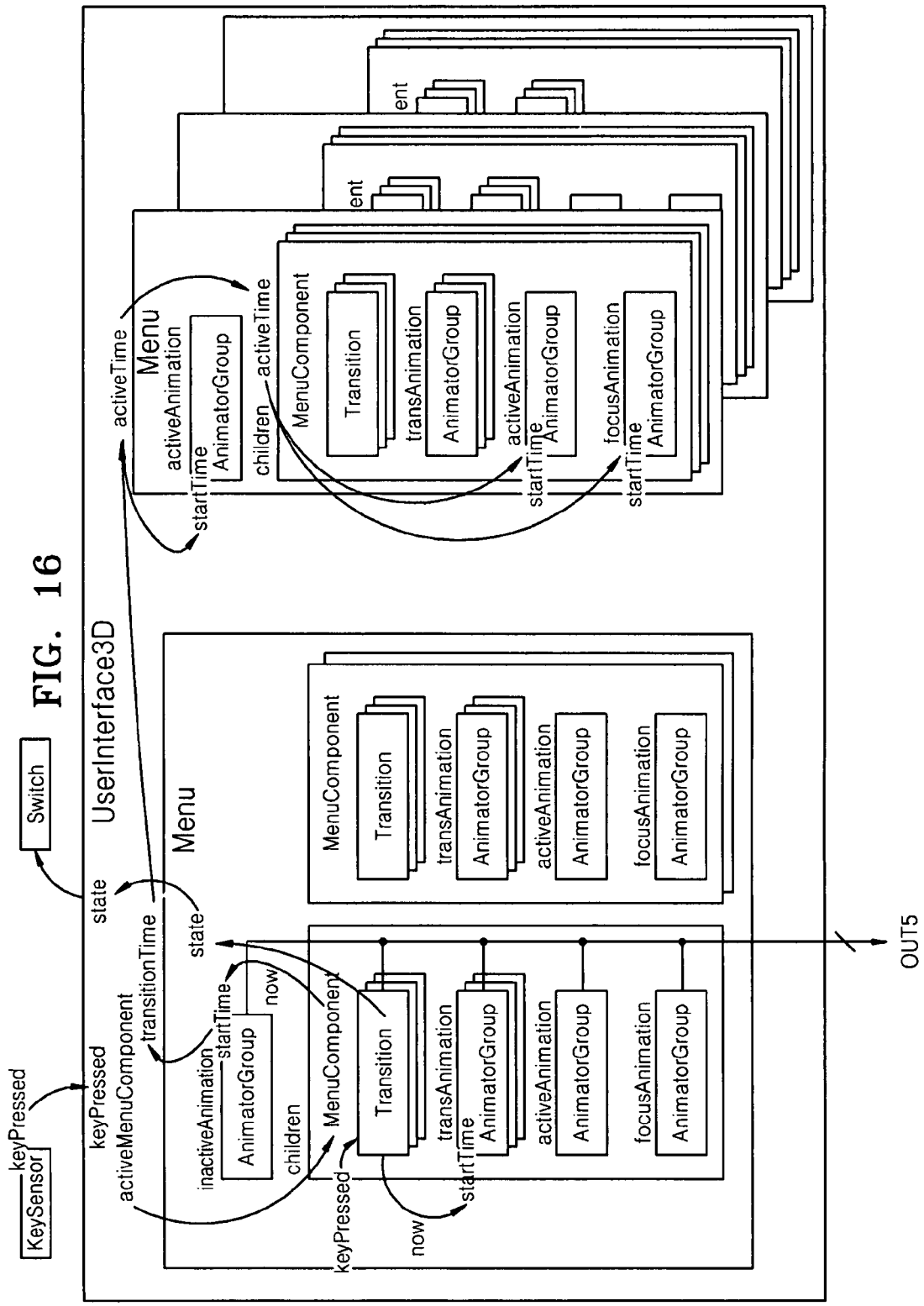
FIG. 16 explain a rendering process, according to an embodiment of the present invention when a rendering apparatus is manipulated.

FIG. 16 explains a rendering process, according to an embodiment of the present invention when, e.g., a rendering apparatus is manipulated. According to an embodiment of the present invention, a menu node indicated by a state to be transit to by user's manipulation of the rendering apparatus may be different from a menu node activated at the time of user's manipulation of the rendering apparatus. When the user manipulates the rendering apparatus in order to view the UI screen illustrated in FIG. 1B or 1C in a state where the UI screen illustrated in FIG. 1A or 1B is displayed, a rendering process may be described as a rendering process according to an embodiment of the present invention as follows.

Once the user presses any one of the buttons included in the rendering apparatus for a short time, the manipulation result may be a keyPressed field value of a key sensor node. The keyPressed field value of the key sensor node may be delivered to a UI node and thus a keyPressed field value of the UI node may be updated with the delivered keyPressed field value.

A "state to be transited to" corresponding to the keyPressed field value of the UI node may be determined according to a description in a transitions field value of the activated item node, and information about the determined state may be delivered to a menu node as a state field value of a transition node. Thus, a state field value of the menu node may be updated with the delivered state field value. In addition, the state field value of the menu node may be delivered to the UI node as a state field value of the UI node. Thus, the state field value of the UI node may be updated with the delivered state field value. The state field value of the UI node may be delivered to a switch node as a state field value of the switch node. Thus, the state field value of the switch node may be updated with the delivered state field value.

If there is no item node indicated by a state to be transited to from among item nodes that are subordinate to a menu node as in an embodiment of the present invention, a transition-Time field value of the UI node may be an activeTime field value of the item node indicated by the state to be transited to. To this end, the startTime field value of an animator node included in an animator group node describing inactive animation applied to the menu node activated at the time of user's manipulation of the button included in the rendering apparatus may be updated with "now", and the transitionTime field value of the UI node may be updated with the updated startTime field value. In addition, "now" may be the startTime field value3 of an animator node included in an animator group node describing transAnimation applied to an item node activated at the time of the user's manipulation of the button. In FIG. 16, whenever the user manipulates a button included in the rendering apparatus, the rendering apparatus, according to the present invention, may recognize the point of time at which the user manipulates the button as "now". If the start point of rendering of inactiveAnimation applied to the menu node activated at the time of the user's manipulation of the rendering apparatus is not the same as the start point of rendering of transAnimation applied to the item node activated at the time of the user's manipulation of the rendering apparatus as illustrated in FIG. 16, whether or not the start point of rendering of inactiveAnimation is the same as the stop point of rendering of transAnimation applied to the item node activated at the time of user's manipulation of the rendering apparatus may be prescribed in an animationOrder field described in the menu node activated at the time of user's manipulation of the rendering apparatus.

The transitionTime field value of the UI node may serve as the activeTime field value of the menu node indicated by the state to be transit to, thereby activating the menu node indicated by the state to be transited to.

Here, if the start point of rendering of activeAnimation applied to the item node indicated by the state to be transited to is not the same as the start point of rendering of activeAnimation applied to the menu node, whether or not the start point of rendering of activeAnimation applied to the item node may be the same as the stop point of rendering of activeAnimation applied to the menu node is prescribed in the animationOrder field value of the menu node indicated by the state to be transit to.

Moreover, whether the start point of rendering of focusAnimation applied to the item node indicated by the state to be transited to is the start point of rendering of activeAnimation applied to the item node indicated by the state to be transit to or the stop point of rendering of activeAnimation applied to the item node indicated by the state to be transit to may be prescribed in the animationOrder field value of the item node indicated by the state to be transit to.

The analysis unit 220 may analyze the above nodes (e.g., a UI node, a menu node, an item node, a transition node, an animator node, and an animator group node) and output the analysis result, e.g., to the rendering unit 250 through an output terminal OUT 5.

Figure 17:
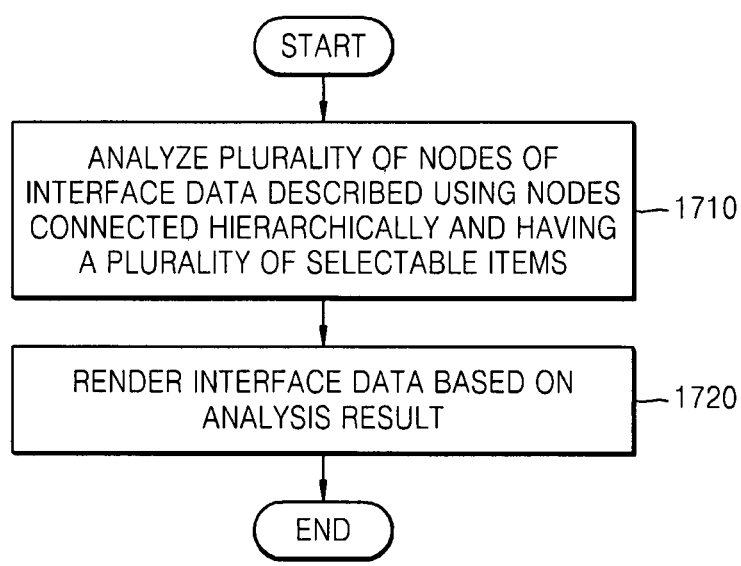
FIG. 17 illustrates a rendering method, according to an embodiment of the present invention.

FIG. 17 illustrates a rendering method, according to an embodiment of the present invention. The rendering method may include operations 1710 and 1720 to render interface data that is described in a manner that allows it to be created quickly.

The analysis unit 220 may analyze a plurality of nodes of interface data that are described using the plurality of nodes connected hierarchically and may have a plurality of selectable items in operation 1710.

In operation 1720, the rendering unit 250 may render the interface data based on the analysis result of operation 1710.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable recording medium having recorded thereon data described using a plurality of nodes connected hierarchically, the plurality of nodes comprising:

at least one user interface (UI) node;
a plurality of menu nodes that are nearest neighbor sub nodes of the UI node and are selectable; and
a plurality of item nodes that are nearest neighbor sub nodes of the menu nodes and describe a plurality of selectable items,
wherein an interpolator node is subordinate to an animator node that is subordinate to one of the plurality of menu nodes and the plurality of item nodes, and
wherein the interpolator node describes only a portion of original animation and/or the interpolator node describes original animation inversely.

2. The computer-readable recording medium of claim 1, wherein each of the UI node, the menu nodes, and the item nodes has unique state information.

3. The computer-readable recording medium of claim 1, wherein each time the activated menu node and the activated item node are changed, the UI node includes identification information of the changed menu node and the changed item node.

4. The computer-readable recording medium of claim 3, wherein each time the activated item node is changed, the menu node includes identification information of the changed item node.

5. The computer-readable recording medium of claim 1, wherein the UI node includes binding associated time information.

6. The computer-readable recording medium of claim 1, wherein the UI node can include a manipulation result.

7. The computer-readable recording medium of claim 1, wherein each of the menu node and the item node indicate at least one animation and the starting time point of rendering of the animation.

8. The computer-readable recording medium of claim 1, wherein at least one transition node including at least one piece of state information mapped to at least one manipulation result is subordinate to the item node.

* * * * *

UNITED STATES PATENT AND TRADEMARK OFFICE
CERTIFICATE OF CORRECTION

PATENT NO. : 8,581,934 B2
APPLICATION NO. : 11/898777
DATED : November 12, 2013
INVENTOR(S) : Sang-oak Woo et al.

It is certified that error appears in the above-identified patent and that said Letters Patent is hereby corrected as shown below:

Title Page, Item (56) (Other Publications), Line 2, Delete "20010162506.2" and insert -- 200710162506.2 --, therefor.

Signed and Sealed this
Twenty-fifth Day of March, 2014

Michelle K. Lee
*Deputy Director of the United States Patent and Trademark Office*